United States Patent
Gotoh et al.

(10) Patent No.: US 10,200,851 B2
(45) Date of Patent: Feb. 5, 2019

(54) POSITION INFORMATION DISTRIBUTION SERVER, POSITION INFORMATION DISTRIBUTION METHOD, POSITION INFORMATION DISTRIBUTION PROGRAM, AND POSITION INFORMATION TRANSMISSION SYSTEM

(71) Applicant: GENETEC CORPORATION, Tokyo (JP)

(72) Inventors: Yoshihito Gotoh, Tokyo (JP); Kenji Ueno, Tokyo (JP)

(73) Assignee: GENETEC CORPORATION, Tokyo (JP)

( * ) Notice: Subject to any disclaimer, the term of this patent is extended or adjusted under 35 U.S.C. 154(b) by 0 days.

(21) Appl. No.: 15/585,385

(22) Filed: May 3, 2017

(65) Prior Publication Data
US 2017/0238165 A1    Aug. 17, 2017

Related U.S. Application Data

(63) Continuation of application No. PCT/JP2016/051654, filed on Jan. 21, 2016.

(30) Foreign Application Priority Data

Jan. 26, 2015  (JP) .................. 2015-012209

(51) Int. Cl.
*H04W 4/02* (2018.01)
*H04W 8/04* (2009.01)
(Continued)

(52) U.S. Cl.
CPC ............ *H04W 8/04* (2013.01); *H04M 11/00* (2013.01); *H04W 4/02* (2013.01); *H04W 8/08* (2013.01);
(Continued)

(58) Field of Classification Search
CPC ..... H04W 64/00; H04W 4/02; H04W 64/006; H04W 4/028; H04W 4/023; H04W 4/025;
(Continued)

(56) References Cited

U.S. PATENT DOCUMENTS

| 7,412,400 B1 | 8/2008 | Bhela et al. |
| 2002/0138650 A1* | 9/2002 | Yamamoto .............. H04W 4/02 709/245 |

(Continued)

FOREIGN PATENT DOCUMENTS

| EP | 2696564 A1 | 2/2014 |
| JP | 2003-047033 A | 2/2003 |

(Continued)

OTHER PUBLICATIONS

International Search Report issued in International Application No. PCT/JP2016/051654 dated Apr. 12, 2016 and translation thereof (5 pages).

(Continued)

*Primary Examiner* — Lester G Kincaid
*Assistant Examiner* — Dung L Lam
(74) *Attorney, Agent, or Firm* — Nakanishi IP Associates, LLC

(57) ABSTRACT

A position information distribution server includes: a communication unit that is provided outside a core network and receives identification information of a cellular phone and position information of the cellular phone from base transceiver stations, switching centers, VLRs, or an HLR; and a recording unit that records a first table including information to specify a server transmitting the position information among position information provision servers, for each identification information of the cellular phone. The position information provision servers are servers that provide position information services for transmitting the position infor- (Continued)

| Identification information ICCID | Transmission destination |
|---|---|
| 8981 1000 2215 2967 705 | 2, 3 |
| 8081 1000 2352 6178 136 | |
| 8981 1000 2353 3781 179 | 1 |
| 8081 1000 2062 0124 537 | 1, 3 |
| 8981 1000 5270 0119 194 | 2 | mation transmitted from the position information distribution server to information terminals. When the communication unit receives the identification information and the position information of the cellular phone, the communication unit transmits the identification information and the position information of the cellular phone to a server shown in the first table among the position information provision servers.

17 Claims, 8 Drawing Sheets

(51) Int. Cl.
    *H04M 11/00*     (2006.01)
    *H04W 88/18*     (2009.01)
    *H04W 8/08*     (2009.01)
    *H04W 80/04*     (2009.01)
    *H04W 92/02*     (2009.01)
    *H04W 8/10*     (2009.01)

(52) U.S. Cl.
    CPC ........... *H04W 80/04* (2013.01); *H04W 88/18* (2013.01); *H04W 92/02* (2013.01); *H04W 8/10* (2013.01)

(58) Field of Classification Search
    CPC ..... H04W 64/003; H04W 8/04; H04W 92/02; H04W 80/04; H04W 8/08; H04W 88/18; H04W 8/10; H04M 11/00
    USPC ........................ 455/456.1–456.6, 457, 404.1
    See application file for complete search history.

(56) References Cited

U.S. PATENT DOCUMENTS

| | | | |
|---|---|---|---|
| 2003/0125045 A1* | 7/2003 | Riley | ................ G01S 5/0205 455/456.1 |
| 2005/0032529 A1* | 2/2005 | Akama | ................ H04W 8/08 455/456.2 |
| 2008/0227471 A1* | 9/2008 | Dankar | ............ G06Q 20/3224 455/456.6 |
| 2014/0297843 A1 | 10/2014 | Shiga et al. | |
| 2014/0360073 A1* | 12/2014 | Stewart | ................ F41A 17/063 42/70.11 |

FOREIGN PATENT DOCUMENTS

| | | |
|---|---|---|
| JP | 2009-060657 A | 3/2009 |
| JP | 2009-165091 A | 7/2009 |
| JP | 2014-197759 A | 10/2014 |

OTHER PUBLICATIONS

Written Opinion of International Searching Authority issued in International Application No. PCT/JP2016/051654 dated Apr. 12, 2016 (4 pages).

Written Opinion of International Searching Authority issued in International Application No. PCT/JP2016/051654 dated Apr. 12, 2016 and translation thereof (8 pages).

Extended European Search Report issued in European Patent Application No. 16743214.5, dated Aug. 21, 2018 (8 pages).

* cited by examiner

Fig. 2

| Identification information ICCID | Latitude | Longitude | Positioning date and time | Positioning accuracy |
|---|---|---|---|---|
| 8981 1000 2215 2967 705 | 35.657102 | 139.745820 | December 2, 2007 10:10 | 1 |
| 8081 1000 2352 6178 136 | 35.632221 | 139.883071 | December 2, 2007 10:08 | 3 |
| 8981 1000 2353 3781 179 | 35.632224 | 139.883075 | December 2, 2007 10:12 | 3 |
| 8081 1000 2062 0124 537 | 35.022952 | 138.479662 | December 2, 2007 08:30 | 2 |
| 8981 1000 5270 0119 194 | 34.321205 | 134.045113 | December 2, 2007 10:15 | 1 |

Fig. 3

| Identification information ICCID | Transmission destination |
|---|---|
| 8981 1000 2215 2967 705 | 2, 3 |
| 8081 1000 2352 6178 136 | |
| 8981 1000 2353 3781 179 | 1 |
| 8081 1000 2062 0124 537 | 1, 3 |
| 8981 1000 5270 0119 194 | 2 |

Fig. 4

| Identification information ICCID | User name | Phone number |
|---|---|---|
| 8981 1000 2353 3781 179 | TANAKA ● × | 090-× ×○○-△△× × |
| 8081 1000 2062 0124 537 | YAMADA △ ■ | 090-□□□□-○○× × |

Fig. 5

| Latitude | Longitude | Area name |
|---|---|---|
| . | . | . |
| 34.320651 | 134.047992 | Kaminocho 2, Takamatsu city, Kagawa prefecture |
| 34.321207 | 134.045112 | Kaminocho 1, Takamatsu city, Kagawa prefecture |
| 34.322504 | 134.051178 | Kaminocho 3, Takamatsu city, Kagawa prefecture |
| . | . | . |
| 35.022647 | 138.480526 | Ninomarucho 4, Shimizu-ku, Shizuoka city, Shizuoka prefecture |
| 35.022953 | 138.479664 | Ninomarucho 3, Shimizu-ku, Shizuoka city, Shizuoka prefecture |
| 35.023428 | 138.479754 | Ninomarucho 2, Shimizu-ku, Shizuoka city, Shizuoka prefecture |
| . | . | . |
| 35.632226 | 139.883076 | Maihama 1, Urayasu city, Chiba prefecture |
| 35.636206 | 139.889068 | Maihama 3, Urayasu city, Chiba prefecture |
| 35.640095 | 139.884202 | Maihama 2, Urayasu city, Chiba prefecture |
| . | . | . |
| 34.655436 | 139.751744 | Shibakouen 2, Minato-ku, Tokyo prefecture |
| 35.657143 | 139.745972 | Shibakouen 4, Minato-ku, Tokyo prefecture |
| 35.660000 | 139.746334 | Shibakouen 3, Minato-ku, Tokyo prefecture |
| . | . | . |

Fig. 6

| User name | Phone number | Area name | Positioning date and time | Positioning accuracy |
|---|---|---|---|---|
| TANAKA ●× | 090-××○○-△△×× | Maihama 1, Urayasu city, Chiba prefecture | December 2, 2007 10:12 | 3 |
| YAMADA △■ | 090-□□□□-○○×× | Ninomarucho 3, Shimizu-ku, Shizuoka city, Shizuoka prefecture | December 2, 2007 08:30 | 2 |

Fig. 8

| Identification information ICCID | Latitude | Longitude | Height | Positioning date and time | Positioning accuracy |
|---|---|---|---|---|---|
| 8981 1000 2215 2967 705 | 35.657102 | 139.745820 | 100 | December 2, 2007 10:10 | 1 |
| 8081 1000 2352 6178 136 | 35.632221 | 139.883071 | 1 | December 2, 2007 10:08 | 3 |
| 8981 1000 2353 3781 179 | 35.632224 | 139.883075 | 2 | December 2, 2007 10:12 | 3 |
| 8081 1000 2062 0124 537 | 35.022952 | 138.479662 | 300 | December 2, 2007 08:30 | 2 |
| 8981 1000 5270 0119 194 | 34.321205 | 134.045113 | 10 | December 2, 2007 10:15 | 1 |

POSITION INFORMATION DISTRIBUTION SERVER, POSITION INFORMATION DISTRIBUTION METHOD, POSITION INFORMATION DISTRIBUTION PROGRAM, AND POSITION INFORMATION TRANSMISSION SYSTEM

CROSS-REFERENCE TO RELATED APPLICATIONS

This application is a continuation application of International Patent Application No. PCT/JP2016/051654 filed on Jan. 21, 2016, which claims priority to Japanese Patent Application No. 2015-012209 filed on Jan. 26, 2015, the entire contents of which are incorporated by reference.

TECHNICAL FIELD

The present invention relates to a position information distribution server or the like.

BACKGROUND ART

In Patent Literature or the like, a position information transmission system for providing position information to an information terminal such as a cellular phone is suggested.

CITATION LIST

Patent Literature

Patent Literature 1: JP 2009-165091 A

However, in the position information transmission system, it is necessary to acquire position information of a cellular phone from a facility of a communication carrier such as an HLR at any time. When a plurality of position information transmission systems operate, it is necessary to transmit the position information from the communication carrier to the plurality of position information transmission systems. If the position information transmission systems increase, a load of a transmission source such as the HLR increases.

SUMMARY OF INVENTION

One or more embodiments of the present invention provide a position information distribution server or the like that can provide position information without increasing a load on facilities of communication carriers.

In one or more embodiments of the present invention, a position information distribution server includes: a communication unit (e.g., transmitter and receiver) that receives identification information of a cellular phone and position information of the cellular phone from base transceiver stations, switching centers, VLRs, or an HLR; and a recording unit that records a first table including information to specify a server transmitting the position information among position information provision servers, for each identification information of the cellular phone. The position information distribution server is provided outside a core network including the switching centers and the HLR. The position information provision servers are servers that provide position information services for transmitting the position information transmitted from the position information distribution server to information terminals. When the communication unit receives the identification information and the position information of the cellular phone, the communication unit transmits the identification information and the position information of the cellular phone to a server shown in the first table among the position information provision servers. Position information received by the position information distribution server in the position information includes latitude/longitude information of the cellular phone, identification information or latitude/longitude information of a base transceiver station performing communication with the cellular phone among the base transceiver stations, or identification information or latitude/longitude information of a base transceiver station area including the base transceiver station performing communication with the cellular phone among the base transceiver stations. Position information transmitted from the position information distribution server to the position information provision servers in the position information includes the latitude/longitude information or an area name of the cellular phone, the latitude/longitude information or an area name of the base transceiver station performing communication with the cellular phone among the base transceiver stations, or the latitude/longitude information or an area name of the base transceiver station area including the base transceiver station performing communication with the cellular phone among the base transceiver stations.

Because the position information distribution server transmits the position information necessary for each of the servers (position information provision servers) providing the position information, communication with facilities (switching centers or the like) of communication carriers is completed by only the position information distribution server.

For this reason, even though the servers providing the position information increase, a load of transmission of the position information from the existing facilities (devices in the core network) of the communication carriers such as the switching centers does not increase due to the increase in the servers.

The position information is more likely to be needed when a communication line is congested such as when natural disasters occur. However, in one or more embodiments of the present invention, the position information is only transmitted from the existing facilities of the communication carriers to the position information distribution server, so that the position information is transmitted from the position information distribution server to a plurality of servers of the position information provision servers. Therefore, the possibility of disturbing other lines in the communication carriers can be decreased.

Preferably, the identification information of the cellular phone is at least one of identification information of a terminal of the cellular phone and identification information of an SIM card attached to the cellular phone.

More preferably, the identification information of the cellular phone is the identification information of the SIM card attached to the cellular phone, and the identification information of the SIM card attached to the cellular phone is an ICCID.

When an ICCID corresponding to a phone number of the cellular phone is used as the identification information of the cellular phone, correct information is more likely to be obtained as position information of a user of the cellular phone, as compared with a form in which information unique to a terminal of the cellular phone is used as the identification information of the cellular phone.

Preferably, the first table is updated on the basis of information transmitted from each of the position information provision servers.

The number of steps for setting can be decreased and setting contents of each server of the position information provision servers and the first table can be matched.

More preferably, the recording unit records the identification information and the position information of the cellular phone received from the base transceiver stations, the switching centers, the VLRs, or the HLR as a first position information database.

A first position information database is recorded in the recording unit. For this reason, when setting for transmitting position information of a specific cellular phone to any server of the position information provision servers is newly added to the first table, the position information of the specific cellular phone can be immediately transmitted to the position information provision servers after the first table is updated.

Preferably, at the time of position registration communication for the HLR, the communication unit receives a part of information included in information transmitted to the HLR as the identification information and the position information of the cellular phone.

Preferably, the communication unit receives the identification information and the position information of the cellular phone from mobile switching centers in the switching centers, not through gateway mobile switching centers in the switching centers.

Preferably, the position information received by the position information distribution server in the position information includes the identification information or height information of the base transceiver station performing communication with the cellular phone among the base transceiver stations, or the identification information or height information of the base transceiver station area including the base transceiver station performing communication with the cellular phone among the base transceiver stations. The position information transmitted from the position information distribution server to the position information provision servers in the position information includes the height information of the base transceiver station performing communication with the cellular phone among the base transceiver stations, or the height information of the base transceiver station area including the base transceiver station performing communication with the cellular phone among the base transceiver stations. The height information of the base transceiver station shows a mean elevation of call area of the base transceiver station. The height information of the base transceiver station area shows a mean elevation of call area of the base transceiver station area.

The height information is added to the position information, so that the information is available for hazard prediction such as a tsunami and a high tide water.

Preferably, the position information received by the position information distribution server in the position information includes positioning accuracy information. The position information transmitted from the position information distribution server to the position information provision servers in the position information includes the positioning accuracy information.

The positioning accuracy information is included as the position information, so that the position information provided from the position information provision servers can be changed according to positioning accuracy.

In one or more embodiments of the present invention, a position information distribution method in a position information distribution server includes: a reception step of causing a communication unit to receive identification information of a cellular phone and position information of the cellular phone from base transceiver stations, switching centers, VLRs, or an HLR; and a transmission step of causing the communication unit to transmit the identification information and the position information of the cellular phone to a server shown in a first table among position information provision servers, when the communication unit receives the identification information and the position information of the cellular phone. The position information distribution server is provided outside a core network including the switching centers and the HLR. The first table includes information to specify a server transmitting the position information among the position information provision servers, for each identification information of the cellular phone, and is recorded in a recording unit of the position information distribution server. The position information provision servers are servers that provide position information services for transmitting the position information transmitted from the position information distribution server to information terminals. Position information received by the position information distribution server in the position information includes latitude/longitude information of the cellular phone, identification information or latitude/longitude information of a base transceiver station performing communication with the cellular phone among the base transceiver stations, or identification information or latitude/longitude information of a base transceiver station area including the base transceiver station performing communication with the cellular phone among the base transceiver stations. Position information transmitted from the position information distribution server to the position information provision servers in the position information includes the latitude/longitude information or an area name of the cellular phone, the latitude/longitude information or an area name of the base transceiver station performing communication with the cellular phone among the base transceiver stations, or the latitude/longitude information or an area name of the base transceiver station area including the base transceiver station performing communication with the cellular phone among the base transceiver stations.

In one or more embodiments of the present invention, a position information distribution program in a position information distribution server executes a reception step of causing a communication unit to receive identification information of a cellular phone and position information of the cellular phone from base transceiver stations, switching centers, VLRs, or an HLR, and a transmission step of causing the communication unit to transmit the identification information and the position information of the cellular phone to a server shown in a first table among position information provision servers, when the communication unit receives the identification information and the position information of the cellular phone. The position information distribution server is provided outside a core network including the switching centers and the HLR. The first table includes information to specify a server transmitting the position information among the position information provision servers, for each identification information of the cellular phone, and is recorded in a recording unit of the position information distribution server. The position information provision servers are servers that provide position information services for transmitting the position information transmitted from the position information distribution server to information terminals. Position information received by the position information distribution server in the position information includes latitude/longitude information of the cellular phone, identification information or latitude/longitude information of a base transceiver station performing communication with the cellular phone among the base transceiver stations, or identification information or latitude/longitude information of abase transceiver station area including the base transceiver station performing communication with the cellular phone among the base transceiver stations. Position information transmitted from the position information distribution server to the position information provision servers in the position information includes the latitude/longitude information or an area name of the cellular phone, the latitude/longitude information or an area name of the base transceiver station performing communication with the cellular phone among the base transceiver stations, or the latitude/longitude information or an area name of the base transceiver station area including the base transceiver station performing communication with the cellular phone among the base transceiver stations.

In one or more embodiments of the present invention, a position information transmission system in a position information distribution server includes: position information provision servers; and a position information distribution server having a communication unit that receives identification information of a cellular phone and position information of the cellular phone from base transceiver stations, switching centers, VLRs, or an HLR, and a recording unit that records a first table including information to specify a server transmitting the position information among position information provision servers, for each identification information of the cellular phone. The position information distribution server is provided outside a core network including the switching centers and the HLR. The position information provision servers are servers that provide position information services for transmitting the position information transmitted from the position information distribution server to information terminals. When the communication unit receives the identification information and the position information of the cellular phone, the position information distribution server transmits the identification information and the position information of the cellular phone to a server shown in the first table among the position information provision servers. Position information received by the position information distribution server in the position information includes latitude/longitude information of the cellular phone, identification information or latitude/longitude information of a base transceiver station performing communication with the cellular phone among the base transceiver stations, or identification information or latitude/longitude information of a base transceiver station area including the base transceiver station performing communication with the cellular phone among the base transceiver stations. Position information transmitted from the position information distribution server to the position information provision servers in the position information includes the latitude/longitude information or an area name of the cellular phone, the latitude/longitude information or an area name of the base transceiver station performing communication with the cellular phone among the base transceiver stations, or the latitude/longitude information or an area name of the base transceiver station area including the base transceiver station performing communication with the cellular phone among the base transceiver stations.

As such, according to one or more embodiments of the present invention, a position information distribution server or the like that can provide position information without increasing a load on facilities of communication carriers can be provided.

BRIEF DESCRIPTION OF DRAWINGS

FIG. 2 is a diagram illustrating contents of a first position information database.

FIG. 3 is a diagram illustrating contents of a first table recorded by a position information distribution server.

FIG. 4 is a diagram illustrating contents of a second table recorded by a first server.

FIG. 5 is a diagram illustrating contents of a third table recorded by the first server.

FIG. 6 is a diagram illustrating contents of a second position information database recorded by the first server.

FIG. 8 is a diagram illustrating contents of a first information database including height information.

DESCRIPTION OF EMBODIMENTS

Figure 1:
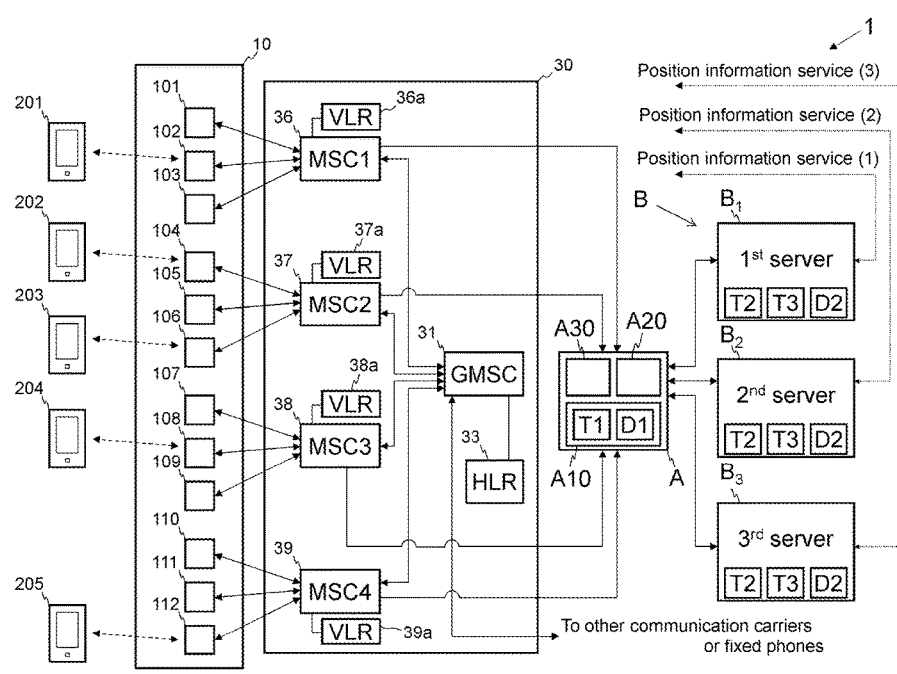
FIG. 1 is a configuration diagram of a position information transmission system according to this embodiment.

Hereinafter, this embodiment will be described using the drawings. A position information transmission system 1 in this embodiment includes a radio access network (RAN) 10, a core network (CN) 30, a position information distribution server A, position information provision servers B (a first server $B_1$, a second server $B_2$, and a third server $B_3$), and first to fifth cellular phones 201 to 205 (refer to FIG. 1).

The radio access network 10 has first to twelfth base transceiver stations (BTSs) 101 to 112 that face the cellular phones and form radio links.

The core network 30 has a gateway mobile switching center (GMSC) 31 for connection with a telephone network such as other communication carrier, a home location register (HLR) 33 to be a database to manage user information such as a cellular phone number, identification information (an identification number of a terminal and an identification number of a subscriber identity module card (SIM card)) of the cellular phone, position information, and first to fourth mobile switching centers (MSCs) 36 to 39 to perform routing (selection of a communication route) of the cellular phone and call setting/disconnection/charging.

The number of each of the position information provision servers B, the cellular phones, the base transceiver stations, and the mobile switching centers is not limited to the above.

In the first to fifth cellular phones 201 to 205, communication such as a call used by a normal cellular phone is enabled using the radio access network 10 and the core network 30. This communication includes communication (call) with other communication carriers or fixed phones through the gateway mobile switching center 31.

For example, communication (call) is enabled through the second base transceiver station 102, the first mobile switching center 36, the gateway mobile switching center 31, the second mobile switching center 37, and the fourth base transceiver station 104, between the first cellular phone 201 and the second cellular phone 202. In an area of the same mobile switching center, communication is enabled not through the gateway mobile switching center 31. For example, between the second cellular phone 202 and the third cellular phone 203 in an area of the same second mobile switching center 37, communication is enabled through the fourth base transceiver station 104, the second mobile switching center 37, and the sixth base transceiver station 106.

The first to third base transceiver stations 101 to 103 are connected to the first mobile switching center 36. The fourth to sixth base transceiver stations 104 to 106 are connected to the second mobile switching center 37. The seventh to ninth base transceiver stations 107 to 109 are connected to the third mobile switching center 38. The tenth to twelfth base transceiver stations 110 to 112 are connected to the fourth mobile switching center 39. The first to fourth mobile switching centers 36 to 39 and the HLR 33 are connected to the gateway mobile switching center 31.

The HLR 33 acquires position information of the first to fifth cellular phones 201 to 205 from a visitor location resister (VLR; first to fourth VLRs 36a to 39a) to be a position registration database for each area covered by each of the first to fourth mobile switching centers 36 to 39.

If position registration communication (communication performed at all times between the cellular phones and the base transceiver stations to inform the core network 30 of the cellular phones being in areas of which base transceiver stations) is performed to acquire the position information, position information for each cellular phone in the first to fourth VLRs 36a to 39a and the HLR 33 is updated. The HLR 33 is used to specify a place of the cellular phone receiving an incoming call (calling) at the time of normal communication.

However, the first to fourth VLRs 36a to 39a may be omitted and position information of the first to fifth cellular phones 201 to 205 may be transmitted from the first to twelfth base transceiver stations 101 to 112 or the first to fourth mobile switching centers 36 to 39 to the HLR 33.

In this embodiment, the position information of the first to fifth cellular phones 201 to 205 are transmitted to the position information distribution server A through the first to twelfth base transceiver stations 101 to 112, the gateway mobile switching center 31, and the first to fourth mobile switching centers 36 to 39.

Specifically, identification information (ICCID: IC Card Identifier, but it may be IMSI: International Mobile Subscriber Identity, IMEI: International Mobile Equipment Identity, or the like) of the first to fifth cellular phones 201 to 205 and position information (latitude/longitude information of the cellular phones, the base transceiver stations performing communication with the cellular phones, or base transceiver station areas including the base transceiver stations, positioning accuracy information, and acquisition date and time of the latitude/longitude information) of the first to fifth cellular phones 201 to 205 are transmitted to the position information distribution server A.

The latitude/longitude information of the base transceiver station shows latitude/longitude information of a specific position (for example, a center of the call area or an arrangement place of the base transceiver station) in a call area of the base transceiver station and latitude/longitude information of each base transceiver station is determined previously.

The base transceiver station area shows a call area of base transceiver stations belonging to the same mobile switching center. However, the base transceiver station area may further show a call area of base transceiver stations belonging to a plurality of mobile switching centers coming close to each other.

The latitude/longitude information of the base transceiver station area shows latitude/longitude information of a specific position (for example, a center of the base transceiver station area) in the base transceiver station area and the latitude/longitude information of each base transceiver station area is determined previously.

The identification information of the cellular phone means information that is represented by a character string of numbers or symbols and is unique to an SIM card included in the cellular phone or a body of the cellular phone.

However, when the ICCID corresponding to a phone number of the cellular phone is used as the identification information of the cellular phone, correct information is more likely to be obtained as position information of a user of the cellular phone, as compared with a form in which information unique to a terminal of the cellular phone is used as the identification information of the cellular phone.

The phone number of the cellular phone can also be used as the identification information of the cellular phone, but it is easy to specify an individual. For this reason, it is preferable to use the ICCID in which it is difficult to specify the individual.

However, when the position information of the base transceiver station or the base transceiver station area is used as the position information of the cellular phone, instead of the latitude/longitude information, identification information such as a name of the base transceiver station or the base transceiver station area may be transmitted to the position information distribution server A, a table (not illustrated in the drawings) to convert the identification information of the base transceiver station or the base transceiver station area into the latitude/longitude information may be recorded by the position information distribution server A, and the identification information of the base transceiver station or the base transceiver station area may be converted into the latitude/longitude information.

Therefore, if at least the identification information of the base transceiver station performing communication with the cellular phone or the base transceiver station area including the base transceiver station can be received as the position information, the position information distribution server A can acquire the position information (latitude/longitude information) for each cellular phone.

When a position of the cellular phone can be specified by GPS positioning, cell-based positioning, or the like, and when the position is transmitted to the base transceiver station, an ICCID corresponding to an identification number of the SIM card included in the cellular phone, latitude/longitude information of the cellular phone, acquisition date and time of the latitude/longitude information, and positioning accuracy information: 1 (accuracy is high) become the position information of the cellular phone.

Otherwise, the ICCID corresponding to the identification number of the SIM card included in the cellular phone, latitude/longitude information of a base transceiver station capable of performing communication with the cellular phone, date and time (acquisition date and time of the latitude/longitude information) when the cellular phone and the base transceiver station can perform communication, and positioning accuracy information: 2 (accuracy is intermediate) or the ICCID corresponding to the identification number of the SIM card included in the cellular phone, latitude/longitude information of a base transceiver station area including the base transceiver station capable of performing communication with the cellular phone, date and time (acquisition date and time of the latitude/longitude information) when the cellular phone and the base transceiver station can perform communication, and positioning accuracy information: 3 (accuracy is low) become the position information of the cellular phone.

The position information received by the position information distribution server A includes latitude/longitude information of the cellular phone, identification information or latitude/longitude information of a base transceiver station performing communication with the cellular phone among the base transceiver stations, or identification information or latitude/longitude information of a base transceiver station area including the base transceiver station performing communication with the cellular phone among the base transceiver stations and includes positioning accuracy information. The position information transmitted from the position information distribution server A to the position information provision servers B includes latitude/longitude information or an area name of the cellular phone, latitude/longitude information or an area name of a base transceiver station performing communication with the cellular phone among the base transceiver stations, or latitude/longitude information or an area name of a base transceiver station area including the base transceiver station performing communication with the cellular phone among the base transceiver stations and includes positioning accuracy information.

The positioning accuracy information is included as the position information, so that the position information provided from the position information provision servers B can be changed according to the positioning accuracy.

When the position information is transmitted to the position information distribution server A, it is considered that the position information is transmitted from the first to twelfth base transceiver stations 101 to 112, the gateway mobile switching center 31, the first to fourth mobile switching centers 36 to 39, or the HLR 33. However, to alleviate a load on the gateway mobile switching center 31 and the HLR 33, as illustrated in FIG. 1, the position information is preferably transmitted from the first to fourth mobile switching centers 36 to 39 to the position information distribution server A, not through the gateway mobile switching center 31 and the HLR 33.

The position information may be transmitted to the position information distribution server A every constant time, when the base transceiver station in which communication is enabled is switched, or when the base transceiver station area in which communication is enabled is switched.

In the position registration communication, a part of position registration information is transmitted from the cellular phone to the HLR 33 through the base transceiver station and the switching center, in order to update user information registered in the HLR 33.

This position registration communication may be used so that the part of the position registration information may be transmitted as the identification information of the cellular phone and the position information of the cellular phone to the position information distribution server A.

In this case, when the base transceiver station in which communication is enabled is switched or when the base transceiver station area in which communication is enabled is switched, the position information is transmitted to the position information distribution server A.

However, the information transmitted to the position information distribution server A is limited to the identification information of the cellular phone and the position information of the cellular phone. A name of a contractor (user) and contract information of the cellular phone are not transmitted.

A communication unit A20 of the position information distribution server A receives the position information transmitted from the first mobile switching center 36 or the like and a control unit A30 creates a first position information database D1 on the basis of this position information and records the first position information database D1 in a recording unit A10 (refer to FIG. 1).

The first position information database D1 is updated whenever the position information is transmitted from the first mobile switching center 36 or the like.

The first position information database D1 is recorded in the recording unit A10. For this reason, when setting for transmitting position information of a specific cellular phone to any server of the position information provision servers B is newly added to a first table T1, the position information of the specific cellular phone can be immediately transmitted to the position information provision servers B after the first table T1 is updated (refer to step S14 of FIG. 7).

In this embodiment, description is given on the assumption that an ICCID of an SIM card included in the first cellular phone 201 is "8981 1000 2215 2967 705", an ICCID of an SIM card included in the second cellular phone 202 is "8081 1000 2352 6178 136", an ICCID of an SIM card included in the third cellular phone 203 is "8981 1000 2353 3781 179", an ICCID of an SIM card included in the fourth cellular phone 204 is "8081 1000 2062 0124 537", and an ICCID of an SIM card included in the fifth cellular phone 205 is "8981 1000 5270 0119 194".

In addition, the recording unit A10 of the position information distribution server A has the first table T1 (identification information-transmission destination server conversion table; refer to FIG. 3) that includes the identification information (ICCID) of the cellular phone and information to specify a server transmitting the position information for each identification information of the cellular phone, among the position information provision servers B (the first server B1, the second server $B_2$, and the third server $B_3$).

The first table T1 may be set and updated through an information terminal such as a personal computer that can perform communication with the position information distribution server A. However, the first table T1 is preferably set and updated on the basis of information set by each of the position information provision servers B. In this case, the number of steps for setting can be decreased and setting contents of each server of the position information provision servers B and the first table T1 can be matched.

Specifically, when service providers and users make a contract with each other about position information services, a user or a manager in each of the position information provision servers B inputs the identification information of the cellular phone to acquire the position information, through the information terminal such as the personal computer capable of performing communication with the position information provision server B, on the basis of contents designating the cellular phone to acquire the position information. Or, the position information provision server B performs communication with the cellular phone to acquire the position information and acquires the identification information of the cellular phone.

Rewriting information (for example, position information of a cellular phone including an SIM card of which an ICCID is "8981 1000 2215 2967 705" is transmitted to the second server $B_2$) of the first table T1 is transmitted from the position information provision server B to the position information distribution server A, on the basis of such an input operation.

The position information distribution server A updates the first table T1, on the basis of the rewriting information.

The first table T1 illustrated in FIG. 3 represents that the position information of the first cellular phone 201 (ICCID: 8981 1000 2215 2967 705) is transmitted to the second server $B_2$ and the third server $B_3$, a transmission destination server is not registered for the position information of the second cellular phone 202 (ICCID: 8081 1000 2352 6178

136), the position information of the third cellular phone 203 (ICCID: 8981 1000 2353 3781 179) is transmitted to the first server $B_1$, the position information of the fourth cellular phone 204 (ICCID: 8081 1000 2062 0124 537) is transmitted to the first server $B_1$ and the third server $B_3$, and the position information of the fifth cellular phone 205 (ICCID: 8981 1000 5270 0119 194) is transmitted to the second server $B_2$, for example.

The position information distribution server A transmits the position information transmitted from the first mobile switching center 36 or the like to the server designated by the first table T1, among the position information provision servers B (the first server $B_1$, the second server $B_2$, and the third server $B_3$).

That is, a program (position information distribution program) for executing a reception step of receiving the identification information (ICCID) of the cellular phone and the position information (latitude/longitude, positioning accuracy, or the like) of the cellular phone from the first mobile switching center 36 or the like and a transmission step of transmitting the received identification information and the received position information of the cellular phone to the server designated by the first table T1 among the position information provision servers is installed in the recording unit A10 of the position information distribution server A and the control unit A30 of the position information distribution server A causes the communication unit A20 to execute the reception step and the transmission step.

Each of the position information provision servers B (the first server $B_1$, the second server $B_2$, and the third server $B_3$) is a server that provides position information services for transmitting the position information of the cellular phone transmitted from the position information distribution server A to the cellular phone or other information terminal.

Each of the position information provision servers B has a second table T2 (identification information-user name conversion table; refer to FIG. 4) showing a relation of identification information of a cellular phone and a user name and a cellular phone number of the cellular phone, and has a third table T3 (latitude/longitude-area name conversion table; refer to FIG. 5) to convert latitude/longitude information into an area name. If the position information and the identification information (ICCID) of each cellular phone are received from the position information distribution server A, each of the position information provision servers B creates a second position information database D2 in which the identification information is converted into a user name or the like of the cellular phone and records the second position information database D2 (refer to FIG. 6).

For example, when natural disasters occur, the first server $B_1$ provides position information services by transmitting position information of a cellular phone of the contractor to a specific information terminal by e-mail.

In addition, the second server $B_2$ provides position information services by transmitting position information of a cellular phone of a person to be monitored, such as a child and an old person, to an information terminal of the contractor by e-mail.

In addition, the third server $B_3$ provides position information services by releasing position information of a cellular phone mounted on an object to be monitored, such as a taxi and a truck, on a browser of the information terminal of the contractor.

FIG. 4 illustrates an example of the second table T2 which the first server $B_1$ has, FIG. 5 illustrates an example of the third table T3 which the first server $B_1$ has, and FIG. 6 illustrates an example of the second position information database D2 which the first server $B_1$ has.

The second position information database D2 is updated when the position information is transmitted from the position information distribution server A.

The second table T2 and the third table T3 are set through the information terminal such as the personal computer that can perform communication with the position information provision servers B.

A notation method of an area name in the third table T3 may be different in each of the first to third servers $B_1$ to $B_3$ and may be commonly used in the first to third servers $B_1$ to $B_3$. When the notation method is commonly used in the first to third servers $B_1$ to $B_3$, conversion from the latitude/longitude information to the area name may be performed at the side of the position information distribution server A.

Figure 7:
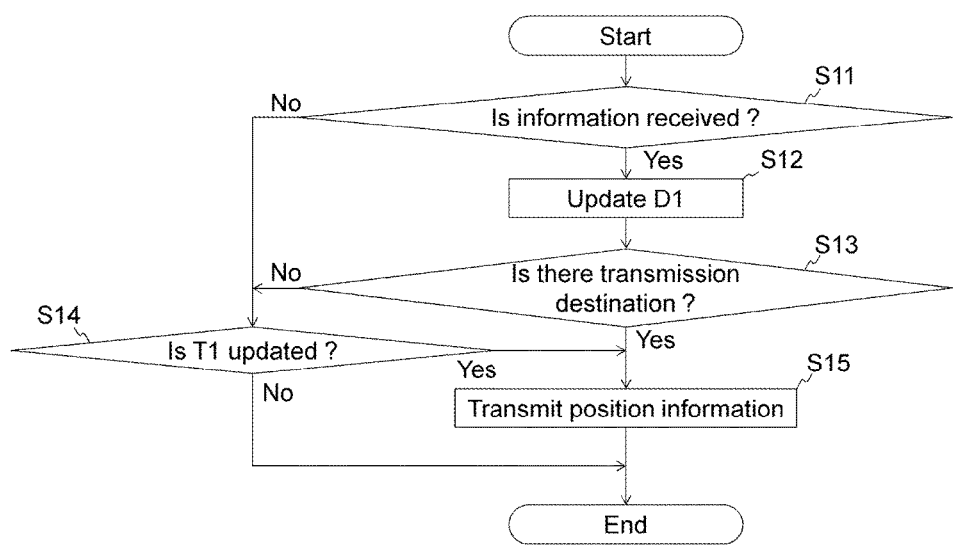
FIG. 7 is a flowchart illustrating a position information transmission control sequence.

Next, a position information transmission control sequence in which the position information distribution server A transmits the position information transmitted from the first mobile switching center 36 or the like to the position information provision servers B (the first server $B_1$, the second server $B_2$, and the third server $B_3$) will be described using a flowchart of FIG. 7.

The position information distribution server A executes operations of the following steps S11 to S15 every constant time (for example, every 10 ms).

The control unit A30 of the server A determines whether position information is transmitted to the position information distribution server A (step S11).

For example, when a base transceiver station area including a base transceiver station in which the third cellular phone 203 is in a communication state is changed, the position information is transmitted from a mobile switching center (second mobile switching center 37) of abase transceiver station area after the change to the server A.

When the transmitted position information is received, the control unit A30 of the server A updates the first position information database D1, on the basis of the position information (reception step; step S12).

When the transmitted position information is not received, the process proceeds to step S14.

The control unit A30 of the server A determines whether the position information updated by step S12 in the position information recorded in the first position information database D1 is transmitted to any server of the position information provision servers B, on the basis of the first table T1 (step S13).

For example, when the position information updated by step S12 is the position information of the third cellular phone 203 (ICCID: 8981 1000 2353 3781 179), it is determined that the position information is transmitted to any server (first server $B_1$) of the position information provision servers B and the process proceeds to step S15.

In addition, when the position information updated by step S12 is the position information of the second cellular phone 202 (ICCID: 8081 1000 2352 6178 136), it is determined that the position information is not transmitted to all of the position information provision servers B and the process proceeds to step S14.

In step S14, the control unit A30 of the position information distribution server A determines whether the first table T1 is updated and position information needs to be newly transmitted to any server of the position information provision servers B.

For example, in the current first table T1 illustrated in FIG. 3, setting for causing the position information of the second cellular phone 202 (ICCID: 8081 1000 2352 6178

136) not to be transmitted to all of the position information provision servers B is given. However, when the first table T1 is updated such that new setting for transmitting the position information to any server (for example, the first server B₁) of the position information provision servers B is added, it is determined that the position information needs to be transmitted and the process proceeds to step S15.

When the first table T1 is not updated or when the first table T1 is updated, but new setting for transmitting the position information to any server of the position information provision servers B is not added, it is determined that the position information does not need to be transmitted and the position information transmission control ends.

The control unit A30 of the position information distribution server A transmits the position information updated in step S12 or the position information in which it is determined in step S14 that the position information needs to be transmitted, to the corresponding position information provision server B, on the basis of the first table T1, and ends the position information transmission control (transmission step; step S15).

For example, when the position information updated in step S12 is the position information of the third cellular phone 203 (ICCID: 8981 1000 2353 3781 179), the control unit of the position information distribution server A transmits the position information to the first server B.

The position information provision server B which has received the position information updates its second position information database D2, on the basis of the position information. The updated second position information database D2 is used for position information services.

In this embodiment, because the position information distribution server A transmits the position information necessary for each of the servers (position information provision servers B) providing the position information, communication with facilities (in this case, the first to fourth mobile switching centers 36 to 39) of communication carriers is completed by only the position information distribution server A.

For this reason, even though the servers providing the position information increase, a load of transmission of the position information from the existing facilities (devices in the core network 30) of the communication carriers such as the switching centers does not increase due to the increase in the servers.

The position information is more likely to be needed when a communication line is congested such as when the natural disasters occur. However, in this embodiment, the position information is only transmitted from the existing facilities of the communication carriers to the position information distribution server A, so that the position information is transmitted from the position information distribution server A to the plurality of servers of the position information provision servers B. Therefore, the possibility of disturbing other lines in the communication carriers can be decreased.

In addition, when the position information distribution server A is provided in the facility of the core network 30, the position information may be limited to the position information of the cellular phones belonging to the communication carrier operating the core network 30.

If the position information distribution server A is provided outside the facility of the core network 30, it is considered that position information from facilities (mobile base transceiver stations or the like) of a plurality of communication carriers as well as position information of cellular phones belonging to one communication carrier is received, the position information of the cellular phones belonging to the various communication carries is managed unitarily and is recorded as the first position information database D1, and the position information is transmitted to each of the position information provision servers B, on the basis of the first table T1.

In addition, the position information distribution server A receives the position information of the cellular phone from the base transceiver station, the switching center, or the like, of the communication carrier for each identification information of the cellular phone. However, the position information distribution server A does not have a user name or the like of the cellular phone.

For this reason, the position information (first position information database D1) for each identification information of the cellular phone recorded in the recording unit A10 of the position information distribution server A cannot be used as useful position information unless a table to convert the identification information to be only a simple character string into a user name is held.

In the position information provision server B, the identification information of the cellular phone and the position information of the cellular phone transmitted from the position information distribution server A can be grasped as the position information corresponding to the user name of the cellular phone, using the second table T2.

As a result, the position information provision server B can inform position information of a specific cellular phone to a user who receives services provided from the position information provision server B.

In addition, height information of the cellular phone, the base transceiver station performing communication with the cellular phone, or the base transceiver station area including the base transceiver station may be included in the position information.

FIG. 8 illustrates an example of the case in which the first position information database D1 includes the height information (unit: m).

When a height of a cellular phone can be specified by GPS positioning or the like and when the height is transmitted to the base transceiver station, an ICCID corresponding to an identification number of an SIM card included in the cellular phone, latitude/longitude information of the cellular phone, height information of the cellular phone, acquisition date and time of the latitude/longitude information and the height information, and positioning accuracy information: 1 (accuracy is high) become position information of the cellular phone.

Otherwise, the ICCID corresponding to the identification number of the SIM card included in the cellular phone, latitude/longitude information of a base transceiver station capable of performing communication with the cellular phone, height information of the base transceiver station, date and time (acquisition date and time of the latitude/longitude information and the height information) when the cellular phone and the base transceiver station can perform communication, and positioning accuracy information: 2 (accuracy is intermediate), or the ICCID corresponding to the identification number of the SIM card included in the cellular phone, latitude/longitude information of a base transceiver station area including the base transceiver station capable of performing communication with the cellular phone, height information of the base transceiver station area, date and time (acquisition date and time of the latitude/longitude information and the height information) when the cellular phone and the base transceiver station can perform communication, and positioning accuracy information: 3 (accuracy is low) become the position information of the cellular phone.

The height information of the base transceiver station shows a mean elevation (height from a mean sea surface such as a neighboring port) of a call area of the base transceiver station or an altitude (height from the mean sea surface), and the height information of the base transceiver station area shows a mean elevation (height from the mean sea surface such as the neighboring port) of a call area of the base transceiver station area or an altitude (height from the mean sea surface). Therefore, height information of each of the base transceiver station and the base transceiver station area is determined previously.

For the height information of the base transceiver station or the base transceiver station area, instead of the height information, identification information such as a name of the base transceiver station or the base transceiver station area may be transmitted to the position information distribution server A, a table (not illustrated in the drawings) to convert the identification information of the base transceiver station or the base transceiver station area into the height information may be recorded by the position information distribution server A, and the identification information of the base transceiver station or the base transceiver station area may be converted into the height information.

Therefore, if at least the identification information of the base transceiver station performing communication with the cellular phone or the base transceiver station area including the base transceiver station can be received as the position information, the position information distribution server A can acquire the position information (the latitude/longitude information and the height information) for each cellular phone.

The position information received by the position information distribution server A includes the height information of the cellular phone, the identification information or the height information of the base transceiver station performing communication with the cellular phone among the base transceiver stations, or the identification information or the height information of the base transceiver station area including the base transceiver station performing communication with the cellular phone among the base transceiver stations. The position information transmitted from the position information distribution server A to the position information provision server B further includes the height information of the cellular phone, the height information of the base transceiver station performing communication with the cellular phone among the base transceiver stations, or the height information of the base transceiver station area including the base transceiver station performing communication with the cellular phone among the base transceiver stations.

The height information is added to the position information, so that the information is available for hazard prediction such as a tsunami and a high tide water.

In the GPS positioning, an error of a vertical direction such as the height tends to increase as compared with information of a horizontal direction such as the latitude and the longitude.

Meanwhile, because the previously determined information can be used as the height information of the call area of the base transceiver station or the base transceiver station area, an error can be decreased.

For this reason, the height information of the call area of the base transceiver station or the base transceiver station area is used, so that concerns about showing totally wrong height information due to the error decrease, as compared with a form in which the height information of the GPS positioning is used.

As compared with when the altitude is used as the height information, when the elevation is used as the height information, the height information compared with the neighboring sea can be accurately known, which is available for the hazard prediction such as the tsunami and the high tide water.

REFERENCE SIGNS LIST 1 position information transmission system
10 radio access network
30 core network
31 gateway mobile switching center
33 HLR
36 to 39 first to fourth mobile switching centers
36a to 39a first to fourth VLRs
101 to 112 first to twelfth base transceiver stations
201 to 205 first to fifth cellular phones
A position information distribution server
A10 recording unit
A20 communication unit
A30 control unit
B position information provision server
$B_1$ to $B_3$ first to third servers
D1, D2 first position information database, second position information database
T1 first table (identification information-transmission destination server conversion table)
T2 second table (identification information-user name conversion table)
T3 third table (latitude/longitude-area name conversion table)

The invention claimed is:
1. A position information distribution server comprising:
a transmitter;
a receiver configured to receive identification information of a cellular phone and position information of the cellular phone from base transceiver stations, switching centers, VLRs, or an HLR;
a processor; and
a storage configured to record a first table including information to specify a server transmitting the position information among position information provision servers, for each identification information of the cellular phone,
wherein:
the position information distribution server is provided outside a core network of a communication carrier;
the core network includes facilities of the communication carrier;
each of the position information provision servers provides position information services for transmitting the position information transmitted from the position information distribution server to information terminals;
when the receiver of the position information distribution server receives the identification information and the position information of the cellular phone, the processor of the position information distribution server is configured to perform a first determination whether the position information is to be transmitted to any of the position information provision servers on the basis of the first table;

when the processor of the position information distribution server determines that the position information is to be transmitted to any of the position information provision servers in the first determination, the processor of the position information distribution server is configured to designate one or more of the position information provision servers based on the first determination and to transmit the identification information and the position information of the cellular phone to the one or more of the position information provision servers;

position information received by the position information distribution server in the position information includes latitude/longitude information of the cellular phone, identification information or latitude/longitude information of a base transceiver station performing communication with the cellular phone among the base transceiver stations, or identification information or latitude/longitude information of a base transceiver station area including the base transceiver station performing communication with the cellular phone among the base transceiver stations; and position information transmitted from the position information distribution server to the position information provision servers in the position information includes the latitude/longitude information or an area name of the cellular phone, the latitude/longitude information or an area name of the base transceiver station performing communication with the cellular phone among the base transceiver stations, or the latitude/longitude information or an area name of the base transceiver station area including the base transceiver station performing communication with the cellular phone among the base transceiver stations.

2. The position information distribution server according to claim 1, wherein
the identification information of the cellular phone is at least one of identification information of a terminal of the cellular phone and identification information of an SIM card attached to the cellular phone.

3. The position information distribution server according to claim 2, wherein
the identification information of the cellular phone is the identification information of the SIM card attached to the cellular phone, and
the identification information of the SIM card attached to the cellular phone is an ICCID.

4. The position information distribution server according to claim 1, wherein
the first table is updated on the basis of information transmitted from each of the position information provision servers.

5. The position information distribution server according to claim 4, wherein
the position information distribution server records the identification information and the position information of the cellular phone received from the base transceiver station, the switching centers, the VLRs, or the HLR as a first position information database;
when the first table is updated, the position information distribution server further determines whether information recorded in the updated table is to be transmitted to any of the position information provision servers in the first determination; and
when the processor of the position information distribution server determines that the position information is to be transmitted to any of the position information provision servers in the first determination, the processor of the position information distribution server is configured to designate one or more of the position information provision servers based on the first determination and transmits the identification information and the position information of the cellular phone to the one or more of the position information provision servers.

6. The position information distribution server according to claim 5,
wherein
the position information distribution server performs a second determination whether the first table is updated such that a new setting for transmitting the position information to any of the position information provision servers is added, and
the position information distribution server transmits the identification information and the position information of the cellular phone to the server when the position information distribution server determined the first table was updated in the second determination.

7. The position information distribution server according to claim 1, wherein
at the time of position registration communication for the HLR, the position information distribution server receives a part of information included in information transmitted to the HLR as the identification information and the position information of the cellular phone.

8. The position information distribution server according to claim 1, wherein
the position information distribution server receives the identification information and the position information of the cellular phone from mobile switching centers in the switching centers, not through gateway mobile switching centers in the switching centers.

9. The position information distribution server according to claim 1, wherein
the position information received by the position information distribution server in the position information includes the identification information or height information of the base transceiver station performing communication with the cellular phone among the base transceiver stations, or the identification information or height information of the base transceiver station area including the base transceiver station performing communication with the cellular phone among the base transceiver stations,
the position information transmitted from the position information distribution server to the position information provision servers in the position information includes the height information of the base transceiver station performing communication with the cellular phone among the base transceiver stations, or the height information of the base transceiver station area including the base transceiver station performing communication with the cellular phone among the base transceiver stations, and
the height information of the base transceiver station shows a mean elevation of call area of the base transceiver station and the height information of the base transceiver station area shows a mean elevation of call area of the base transceiver station area.

10. The position information distribution server according to claim 1, wherein
the position information received by the position information distribution server in the position information includes positioning accuracy information, and the position information transmitted from the position information distribution server to the position information provision servers in the position information includes the positioning accuracy information.

11. The position information distribution server according to claim 1,
   wherein the position information distribution server is provided outside the core network, such that the position information distribution server provides the position information without increasing a load on the facilities of the communication carrier.

12. A position information distribution method in a position information distribution server, the method comprising, causing a processor of the position information distribution server to perform the following steps of:
   a reception step of causing a position information distribution server to receive identification information of a cellular phone and position information of the cellular phone from base transceiver stations, switching centers, VLRs, or an HLR; and
   when the processor of the position information distribution server receives the identification information and the position information of the cellular phone, performing a first determination whether the position information is to be transmitted to any of the position information provision servers on the basis of a first table, wherein the first table includes information to specify a server transmitting the position information among position information provision servers, for each identification information of the cellular phone; and
   designating one or more of the position information provision servers and transmit the identification information and the position information of the cellular phone to the one or more of the position information provision servers, when the processor of the position information distribution server determines that the position information is to be transmitted to any of the position information provision servers in the first determination,
   wherein
   the position information distribution server is provided outside a core network of a communication carrier,
   the core network includes facilities of the communication carrier,
   the position information provision servers provide position information services for transmitting the position information transmitted from the position information distribution server to information terminals,
   position information received by the position information distribution server in the position information includes latitude/longitude information of the cellular phone, identification information or latitude/longitude information of a base transceiver station performing communication with the cellular phone among the base transceiver stations, or identification information or latitude/longitude information of a base transceiver station area including the base transceiver station performing communication with the cellular phone among the base transceiver stations, and
   position information transmitted from the position information distribution server to the position information provision servers in the position information includes the latitude/longitude information or an area name of the cellular phone, the latitude/longitude information or an area name of the base transceiver station performing communication with the cellular phone among the base transceiver stations, or the latitude/longitude information or an area name of the base transceiver station area including the base transceiver station performing communication with the cellular phone among the base transceiver stations.

13. The position information distribution method according to claim 12,
   wherein the position information distribution server is provided outside the core network, such that the position information distribution server provides the position information without increasing a load on the facilities of the communication carrier.

14. A position information distribution program in a position information distribution server, causing a processor of the position information distribution server to execute the steps of:
   a reception step of receiving identification information of a cellular phone and position information of the cellular phone from base transceiver stations, switching centers, VLRs, or an HLR; and
   when the position information distribution server receives the identification information and the position information of the cellular phone, performing a first determination whether the position information is to be transmitted to any of position information provision servers on the basis of a first table, wherein the first table includes information to specify a server transmitting the position information among position information provision servers, for each identification information of the cellular phone; and
   when the processor of the information distribution server determines that the position information is to be transmitted to any of the position information provision servers in the first determination, designating one or more of the position information provision servers to which the position information is to be transmitted, based on the first determination, and transmitting the identification information and the position information of the cellular phone to the one or more of the position information provision servers,
   wherein the position information distribution server is provided outside a core network of a communication carrier,
   the core network includes facilities of the communication carrier,
   the position information provision servers provide position information services for transmitting the position information transmitted from the position information distribution server to information terminals,
   position information received by the position information distribution server in the position information includes latitude/longitude information of the cellular phone, identification information or latitude/longitude information of a base transceiver station performing communication with the cellular phone among the base transceiver stations, or identification information or latitude/longitude information of a base transceiver station area including the base transceiver station performing communication with the cellular phone among the base transceiver stations, and
   position information transmitted from the position information distribution server to the position information provision servers in the position information includes the latitude/longitude information or an area name of the cellular phone, the latitude/longitude information or an area name of the base transceiver station performing communication with the cellular phone among the base transceiver stations, or the latitude/longitude information or an area name of the base transceiver station area including the base transceiver station performing communication with the cellular phone among the base transceiver stations.

15. The position information distribution program according to claim 14,
wherein the position information distribution server is provided outside the core network, such that the position information distribution server provides the position information without increasing a load on the facilities of the communication carrier.

16. A position information transmission system comprising:
position information provision servers, each of which comprises processor and storage; and
a position information distribution server comprising processor and storage configured to receive identification information of a cellular phone and position information of the cellular phone from base transceiver stations, switching centers, VLRs, or an HLR,
wherein:
the storage of the position information distribution server is configured to record a first table including information to specify a server transmitting the position information among position information provision servers, for each identification information of the cellular phone;
the position information distribution server is provided outside a core network of a communication carrier;
the core network includes facilities of the communication carrier;
the processors of the position information provision servers are configured to provide position information services for transmitting the position information transmitted from the position information distribution server to information terminals;
when the position information distribution server receives the identification information and the position information of the cellular phone, the processor of the position information distribution server is configured to perform a first determination a first determination whether the position information is to be transmitted to any of the position information provision servers on the basis of the first table;
when the processor of the position information distribution server determines that the position information is to be transmitted to any of the position information provision servers in the first determination, the processor of the position information distribution server is configured to designate one or more of the position information provision servers based on the first determination and to transmit the identification information and the position information of the cellular phone to the one or more of the position information provision servers;
position information received by the position information distribution server in the position information includes latitude/longitude information of the cellular phone, identification information or latitude/longitude information of a base transceiver station performing communication with the cellular phone among the base transceiver stations, or identification information or latitude/longitude information of a base transceiver station area including the base transceiver station performing communication with the cellular phone among the base transceiver stations; and
position information transmitted from the position information distribution server to the position information provision servers in the position information includes the latitude/longitude information or an area name of the cellular phone, the latitude/longitude information or an area name of the base transceiver station performing communication with the cellular phone among the base transceiver stations, or the latitude/longitude information or an area name of the base transceiver station area including the base transceiver station performing communication with the cellular phone among the base transceiver stations.

17. The position information transmission system according to claim 16,
wherein the position information distribution server is provided outside the core network, such that the position information distribution server provides the position information without increasing a load on the facilities of the communication carrier.

* * * * *